United States Patent
Geeng

(10) Patent No.: US 7,231,514 B2
(45) Date of Patent: Jun. 12, 2007

(54) COMPUTER INCLUDING HI-FI STEREO

(75) Inventor: Shyh-Dar Geeng, Taipei Hsien (TW)

(73) Assignee: iDot Computers, Inc., Taipei Hsien (TW)

( * ) Notice: Subject to any disclaimer, the term of this patent is extended or adjusted under 35 U.S.C. 154(b) by 624 days.

(21) Appl. No.: 10/605,565

(22) Filed: Oct. 9, 2003

(65) Prior Publication Data

US 2004/0107016 A1 Jun. 3, 2004

(30) Foreign Application Priority Data

Oct. 9, 2002 (TW) .............................. 91123311 A

(51) Int. Cl.
*G06F 9/445* (2006.01)
(52) U.S. Cl. .......................................... 713/2; 700/94
(58) Field of Classification Search ................ 713/1, 713/2; 700/94
See application file for complete search history.

(56) References Cited

U.S. PATENT DOCUMENTS

| 6,414,676 B1 | 7/2002 | Boigues ...................... 345/213 |
| 6,928,542 B2* | 8/2005 | Wen et al. ...................... 713/2 |
| 6,948,058 B2* | 9/2005 | Tung .............................. 713/2 |
| 2003/0188144 A1* | 10/2003 | Du et al. ........................ 713/1 |

* cited by examiner

*Primary Examiner*—Brian Pendleton
(74) *Attorney, Agent, or Firm*—Jianq Chyun IP Office

(57) ABSTRACT

A computer including HI-FI stereo is provided. The BIOS of the computer including HI-FI stereo in the embodiment includes a function menu that shows selections of HI-FI stereo and general-purpose computer when the computer including HI-FI stereo is just booted up. The HI-FI stereo function is set up bypassing the routine procedure that is used to activate the operating system of the computer unit and plays associated AV data immediately, while the operating system is activated for setting up a general-purpose computer if the general-purpose computer selection is selected.

9 Claims, 1 Drawing Sheet

COMPUTER INCLUDING HI-FI STEREO

CROSS-REFERENCE TO RELATED APPLICATION

This application claims the priority benefit of Taiwan application serial no. 91123311, filed Oct. 9, 2002.

BACKGROUND OF THE INVENTION

1. Field of Invention

The present invention generally relates to a computer, and more particularly, to a computer including HI-FI stereo.

2. Description of Related Art

In line with technological advancement, the computer has become an absolutely necessary product in modern lives, a truth is that computers take a position getting more and more important in peoples daily works and family lives.

Computer hardware has had great advancement in computing speed and data processing power recently. Nowadays, computers have treated as a widely used multimedia audio-video (AV) equipment with the helps of the technology advancements regarding the field of the optical disk system used for data storage media. However, although modern computers have performance no worse than that of the legacy mainframe systems, which still offers unsatisfied AV effects due to their limited architecture. Although many engineers have offered lots of developments in sound cards and make their designs being more powerful than before. However, any listener cannot be satisfied with the playing AV effects offered by the modern computer systems since the playing ones are far less than that of a 5.1 channel audio system. On the other hand, the commonly used cabinets of the conventional computer systems contain fixed front panel and any housed peripheral device such as a CD-ROM drive may expose its front panel to facilitate the tray movements. The computer cabinet cannot be designed with more aesthetically appealing modeling, which makes the appearances of the conventional computer systems far away from a commonly used stereo system.

Furthermore, it is significant a time-costly way for employing a general-purpose computer used as an AV stereo system because the general-purpose computer system cannot play AV data until computer operating system such as the commonly used Windows system has been started up completely. Customers have to wait for a long time while the operating system is in booting.

SUMMARY OF THE INVENTION

To solve the above problem, the present invention provides a computer including HI-FI stereo, while the Basic Input Output System (abbreviated as BIOS) of the embodiment is modified and both of the stereo unit and the display unit are integrated into the system. Therefore, any user may operate the high performance computer as friendly HI-FI stereo.

To achieve the objects mentioned above and others, the present invention provides a computer including HI-FI stereo that encompasses a storage media, a computer unit, a stereo unit and a display unit. The storage media is used to store computer data or AV data. The computer unit may comprise at least one computer main board and a lot of peripheral devices, wherein one of that the peripheral devices may be used to access computer data or AV data from the storage media. The computer unit also includes a BIOS which encompasses a function menu provided for showing so that a user may select a function from the menu to set the disclosed system as a general-purpose computer or a HI-FI stereo when the system is just powered on. The stereo unit coupled to the computer unit is used to receive audio data delivered by the computer unit and plays HI-FI stereo music sound by means of audio system such as a speaker set, while the video data is played by means of a commonly used display system, such as CRT system or LCD monitor, coupled with the computer unit. The display unit coupled to the computer unit is used to receive a scanning code transferred from the computer unit, and the scanning code is converted to display images for displaying via the display unit.

In the preferred embodiment of the present invention, the peripheral device of the computer including HI-FI stereo that accesses AV data from the storage media may be a CD-ROM drive, a DVD ROM drive, a DVD ROM+CDRW drive, or the like. The stereo unit and the display unit are coupled to the computer unit via an IIC serial bus so as to transmit the scanning code of AV data and display images. When the HI-FI stereo function is selected, the BIOS by-passes the routine procedure for activating the operating system of the computer unit and executes a playback control program to immediately play the AV data.

In the embodiment, the computer including HI-FI stereo further includes an input unit to receive a stereo operation instruction issued by a customer and transfer the received instruction to the computer unit, wherein the input unit such as a computer keyboard or mouse is coupled to the computer unit. Therefore, the computer unit may perform HI-FI stereo operation instructions such as play/pause, forward, backward, stop, volume up, volume down, mute and tray ejection/extraction in response to the stereo operation instructions.

The input unit may contain an infrared reception module used to accept the HI-FI stereo operation instructions such as play/pause, forward, backward, stop, volume up, volume down, mute and tray ejection/extraction aforementioned so as to provide more friendly operations to users.

In the embodiment, the display unit encompasses a memory, a display processor and a LCD module. The memory is used to store the display images, while the display processor is coupled to the memory that receives a scanning code from the computer unit and obtains the display images from the memory in response to the received scanning code. The LCD module is coupled to the display processor and displays the display images delivered from the display processor. The back light emitting color of the LCD module may be designed as a controllable one as applications.

In the embodiment, the display unit may include a real-time clock, which may be aligned by the BIOS of the computer unit to be synchronous with that of the computer unit when the disclosed computer including HI-FI stereo is just powered on. In the embodiment, the standby power of the computer unit may provide power for the real-time clock so that the real-time clock may normally operate even when the computer is powered off. Moreover, a default power on time may be set beforehand. Therefore, the display unit issues a wakeup message to the computer unit via a communication line of a WOL connector coupled to the computer unit to notify the computer to perform associated power on operation when the time indicated by the real-time clock reaches the preset default power on time.

From the above descriptions, the computer including HI-FI stereo has not only the general-purpose computer function, but also includes a HI-FI stereo function. When the HI-FI stereo function is selected, the currently loaded optical disk may be played and user-friendly stereo operations are provided without the helps from additional computer peripheral devices. Time-cost is more degraded than before because the routine procedure for starting the computer operating system is bypassed and only the power on procedure the same as the stereo power on procedure is performed in the disclosed computer including HI-FI stereo.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
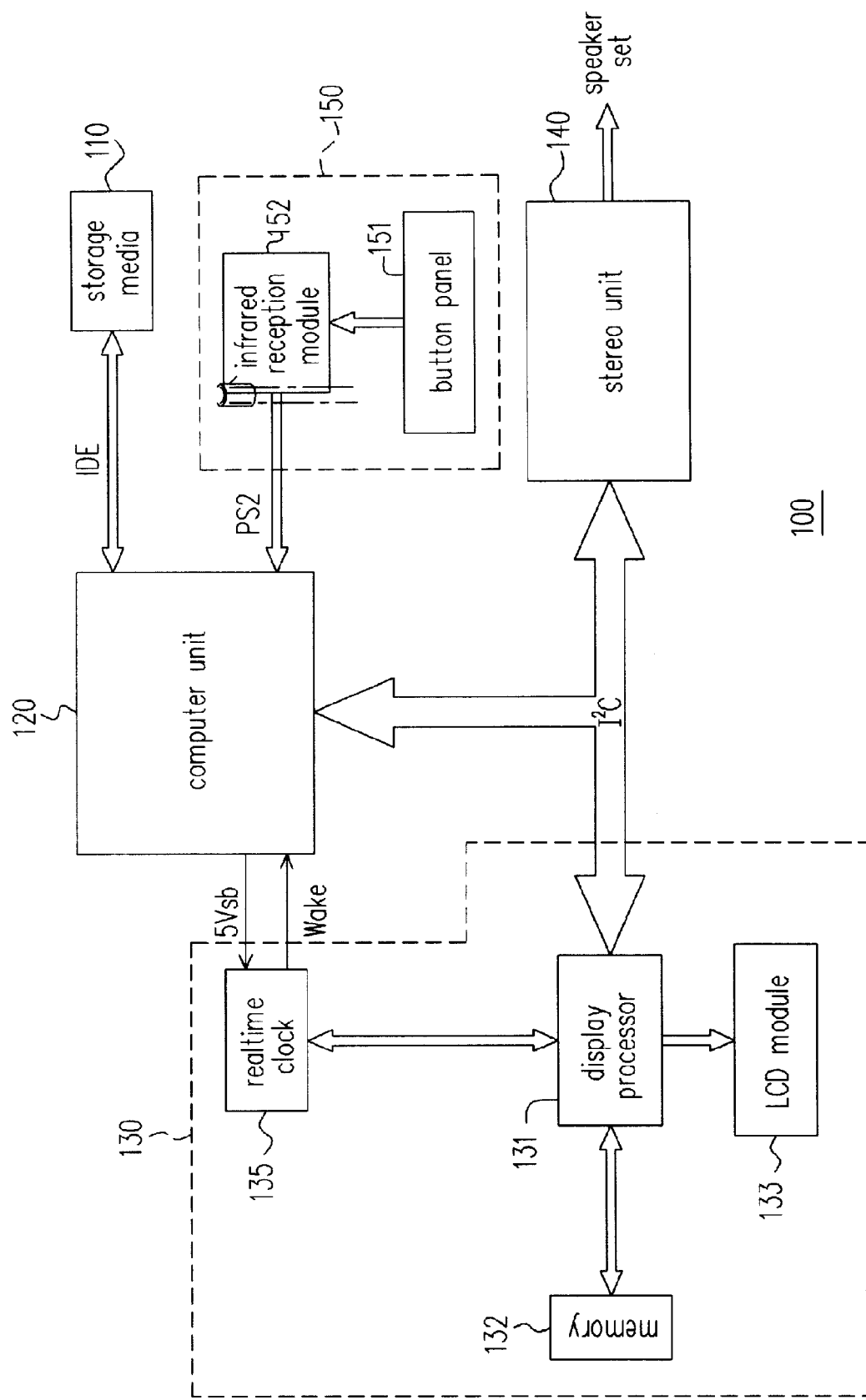
FIG. 1 schematically shows a block diagram of a computer including HI-FI stereo of a preferred embodiment according to the present invention.

FIG. 1 schematically shows a block diagram of a computer including HI-FI stereo of a preferred embodiment according to the present invention. The computer including HI-FI stereo 100 includes a storage media 110, a computer unit 120, a stereo unit 140 and a display unit 130. In order to make the computer including HI-FI stereo 100 being easily controlled by a customer, the computer including HI-FI stereo 100 further encompasses an input unit 150. As shown in the diagram, the computer unit 120 is a central control unit of the computer including HI-FI stereo 100, which is coupled to the storage media 110, the input unit 150, the stereo unit 140 and the display unit 130 via buses such as IDE, PS2 and IIC, respectively.

The storage media 110 in the embodiment is an optical disk being accessed by an optical disk system such as a CD-ROM drive, a DVD ROM drive, a DVD ROM+CDRW (or Combo) drive or the like and is used to store the computer data or AV data. When the computer including HI-FI stereo 100 is used as a general-purpose computer, the storage media 110 can be used as an extension storage media for storing associated computer data. Conversely, the computer including HI-FI stereo 100 may play AV data accessed from the storage media 110 when the computer including HI-FI stereo 100 is used as AV equipment.

The computer unit 120 may include devices such as the computer main board, keyboard, mouse and display system. Furthermore, the computer unit 120 may access the computer data or AV data required for subsequent operations stored on the storage media 110. In the embodiment, the computer unit 120 encompasses a Basic Input Output System (abbreviated as BIOS) with optional functions. A menu embedded in the BIOS is displayed on a screen of the display system when the computer including HI-FI stereo 100 is just powered on, so that a user may select the computer including HI-FI stereo 100 as a general-purpose computer or as a HI-FI stereo according to selections shown on the menu. Accordingly, when the user selects to use the HI-FI stereo function, the BIOS by-passes the routine procedure for activating an operating system used for the computer unit 120 and executes a playback control program included in the BIOS to immediately play the AV data. Time-cost is significantly degraded in the disclosed method since the operating system is by-passed.

The stereo unit 140 is used to receive the AV data delivered from the computer unit 120 and then play HI-FI stereo music sound from an audio system such as a speaker set after the AV data is converted. When the computer including HI-FI stereo 100 is selected to be used as a HI-FI stereo, in addition to using the mouse of the computer unit 120 to operate the stereo, the button panel 151 or the infrared reception module 152 of the input unit 150 may be used to accept the stereo operation instructions that are issued when users press the button or the remote controller. Therefore the computer unit 120 may perform HI-FI stereo operation instructions such as play/pause, forward, backward, stop, volume up, volume down, mute and tray ejection/extraction in response to the stereo operation instructions.

As shown in the diagram, the display unit 130 includes a memory 132, a display processor 131, a LCD module 133 and a real-time clock 135. The memory 132 is used to store display images or the image files regarding the statuses of playing AV data e.g. the current playing volume. Therefore the display processor 131 may access the stored display images or image files from the computer unit 120 according to the scanning code, while the accessed display images or the image files are then transferred to the LCD module 133 for displaying purpose. Moreover, the back light emitting color of the LCD module 133 is controllable so as to provide more colorful display interfaces.

Furthermore, the real-time clock 135 in the display unit 130 receives a synchronization alignment operation from the BIOS of the computer unit 120 when it is just powered on, while the power of the real-time clock 135 is provided by the standby power 5 Vsb of the computer unit 120. Accordingly, the real-time clock 135 may provide a real-time clock message even when the computer including HI-FI stereo 100 is powered off. Besides providing the real-time clock message, the computer including HI-FI stereo 100 also allows a default power on time to be set as user's requirements. Therefore, the display unit 130 issues a wakeup message via a communication line of a WOL connector coupled to the computer unit 120 to perform associated power on operation. Another application by the same Applicant as the present invention entitled "COMPUTER CASE WITH SLIDING PANEL" discloses a structure of a computer case having a sliding panel that can be electrically driven. Furthermore, another application by the same Applicant as the present invention entitled "METHOD FOR OPERATING THE TRAY OF AN OPTICAL DISK SYSTEM" disclose a method for simultaneously operating the tray of an optical disk system and the front panel of the computer case where the optical disk system is housed. Additionally, another application by the same Applicant as the present invention entitled "STEREO SPEAKER" discloses a speaker set for creating sound circularly.

In summary, the present invention at least offers the following advantages.

1. The computer including HI-FI stereo integrates the functions of general-purpose computer and the HI-FI stereo such that a user may select one of the integrated functions as requirements.

2. When the HI-FI stereo function is selected, the computer may play AV data from the currently loaded optical disk and provide friendly stereo operations for customers without aids from additional computer peripheral devices.

3. When the HI-FI stereo function is selected, the disclosed system bypasses the routine procedure for activating the computer operating system and plays AV data from the loaded optical media after the computer is booted up.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A computer including HI-FI stereo, comprising:
   a storage media, used to store a computer data or an audio-video (AV) data;
   a computer unit, used to access the computer data or the AV data stored on the storage media, wherein the computer unit comprises a Basic Input Output System (BIOS) including a function menu so as to provide a selection for setting the computer including HI-FI stereo as a general-purpose computer or as a HI-FI stereo after the computer including HI-FI stereo is booted;
   a stereo unit, used to receive the AV data delivered from the computer unit and to control the AV data being played on an audio system; and
   a display unit, used to displaying statuses of the playing AV data, the display unit comprising a real-time clock, that is used to receive a synchronization alignment from the BIOS when the computer is just powered on.

2. The computer including HI-FI stereo of claim 1, further comprising an input unit for receiving a stereo operation instruction that is used to control HI-FI stereo operations of the computer including HI-FI stereo.

3. The computer including HI-FI stereo of claim 2, wherein the stereo operation instruction comprises play/pause, forward, backward, stop, volume up, volume down, mute or tray ejection/extraction instructions.

4. The computer including HI-FI stereo of claim 1, wherein when the HI-FI stereo function is selected, the BIOS bypasses a routine procedure for activating an operating system of the computer unit and executes a playback control program included in the BIOS to play the AV data.

5. The computer including HI-FI stereo of claim 1, wherein the display unit comprises:
   a memory, used to store an image file regarding the statuses of the playing AV data;
   a display processor, coupled to the memory for controlling operations of displaying the image file; and
   a LCD module, coupled to the display processor and used to display the image file.

6. The computer including HI-FI stereo of claim 5, wherein a back light emitting color of the LCD module is controllable.

7. The computer including HI-FI stereo of claim 1, wherein the power of the real-time clock is provided by a standby power of the computer unit.

8. The computer including HI-FI stereo of claim 7, wherein the display unit delivers a wakeup message to the computer unit when a time indicated by the real-time clock reaches a preset default power on time.

9. The computer including HI-FI stereo of claim 1, wherein the storage media is an optical disk accessed by a CD-ROM drive, a DVD ROM drive, or a DVD ROM+ CDRW drive.

* * * * *